United States Patent Office 3,476,806
Patented Nov. 4, 1969

3,476,806
CONTINUOUS METHYLENEDIANILINE PROCESS
Herbert Otto Wolf, Wilmington, Del., assignor to E. I. du Pont de Nemours and Company, Wilmington, Del., a corporation of Delaware
No Drawing. Continuation-in-part of application Ser. No. 351,195, Mar. 11, 1964. This application Apr. 24, 1967, Ser. No. 632,951
Int. Cl. C07c 87/50
U.S. Cl. 260—570                          2 Claims

ABSTRACT OF THE DISCLOSURE

A continuous process for preparing methylenedianiline of high 4,4'-isomer content by feeding into a reaction zone maintained at 35 to 52° C., aniline hydrochloride and formaldehyde at a mol ratio of 2.8:1 to 4.0:1 and subsequently passing the reaction mass into three rearrangement stages, the first stage having a temperature between 38 to 52° C., the second 60 to 70° C., and the third 88 to 110° C. The product of the rearrangement stages is neutralized and the methylenedianiline is recovered.

CROSS REFERENCE TO RELATED APPLICATIONS

This application is a continuation-in-part application of my copending application Ser. No. 351,195, filed Mar. 11, 1964, and now abandoned.

BACKGROUND OF INVENTION

This invention relates to an improved process for the preparation of methylenedianiline in which both the yield and 4,4'-isomer content are high.

It is known to prepare methylenedianiline by reacting an acid salt of aniline with formaldehyde. It is generally accepted that the first reaction occurring is that of formaldehyde with aniline to give intermediates of the anil type. The intermediates then react further and rearrange to yield methylenedianiline. It has been reported (King, J. Chem. Soc. 117, 988 (1920)) that crude distilled methylenedianiline prepared essentially by this route is a 9:1 mixture of 4,4'- and 2,4'-isomers.

The methylenedianiline so obtained is generally useful as an intermediate for the preparation of 4,4'-methylene-bis(phenyl isocyanate). This isocyanate, hereafter for convenience called MDI, has become increasingly important during recent development for the synthesis of linear polymers. For some applications it is a requirement that the MDI be of extremely high purity; in particular, only a very small amount of the isomeric 2,4'-methylenebis (phenyl isocyanate) can be tolerated. It is therefore necessary to use as the staring material for the MDI a methylenedianiline having an extremely high content of 4,4'-isomer and correspondingly little 2,4'-isomer, viz, less than the reported ratio of 1 to 9.

Methylenedianiline is also useful in many other chemical processes, and several of these processes also require extremely high 4,4'-isomer content.

In addition to the need for obtaining methylenedianiline of this high quality, there is also a need for obtaining the product in high yield. Because of the positions in the aniline molecule which are available for the rearrangement reaction and because of the possibility of forming polymeric products, the reaction to form methylenedianiline is difficult to control to obtain a high yield. This control is particularly difficult when the reaction is run continuously for economical large-scale production.

Prior art processes do not provide a methylenedianiline product obtained in both high yield and having sufficiently high 4,4'-isomer content; these processes are particularly unsatisfactory when operated in continuous fashion.

BRIEF SUMMARY OF THE INVENTION

I have discovered that both the high yield and high 4,4'-isomer content can be obtained by the continuous process of contacting and reacting for a period of from 15 to 130 minutes and at a temperature in the range of 35–52° C.: (a) an aqueous solution containing a mixture of aniline and aniline hydrochloride wherein the molar ratio of total hydrochloric acid to total aniline is in the range 0.85:1 to 0.97:1 with (b) an aqueous solution of formaldehyde, with the molar ratio of total aniline of (a) to formaldehyde of (b) being in the range of 2.8:1 to 4.0:1, to obtain an intermediate condensation mass, continuously subjecting said intermediate condensation mass to rearranging conditions by maintaining said product at 38–52° C. for at least 110 minutes, then at 60–70° C. for at least 110 minutes, and then at 88–110° C. for at least 110 minutes. The reaction and rearranging portion of the process can be carried out by continuously introducing the reactants (a) and (b) into a reaction zone with the rates of withdrawal therefrom being adjusted so that the prescribed reaction or holding period (15 to 130 minutes) is obtained, then by continuously passing the intermediate condensation product or reaction mass to a staged rearranging zone, which can be a series of reactors maintained at the prescribed rearrangement temperatures, and by continuously withdrawing the resulting product from the rearranging zone at such a rate that the prescribed hold-up times are observed.

The resulting product is then neutralized with alkaline material and the resultant organic phase is treated to remove undesirable contaminants whereby methylenedianiline in both high yield and 4,4'-isomer content is obtained. Because of the high content of 4,4'-isomer, relative to 2,4'-isomer in the organic phase before purification treatment, it may be only necessary to remove unreacted aniline and soluble water therefrom by distillation. The resultant non-distilled, crude product, if desired, can be phosgenated without further purification to yield MDI which can easily be purified to a product of high quality. If desired, the crude methylenedianiline can be distilled to greater purity before phosgenation or other use.

A method of continuously neutralizing the product of the rearrangement treatment described previously, comprises continuously introducing said product and a neutralizing agent into a neutralization zone containing a liquid medium and maintaining the liquid medium containing the resulting neutralization product in this zone until said medium reaches a substantially steady-state condition, then passing the neutralization product to another zone wherein the product is allowed to separate into aqueous and organic phases, and isolating the organic phase from the aqueous phase. The methylenedianiline can then be recovered from the organic phase by distillation.

DETAILED DESCRIPTION OF THE INVENTION

The process of this invention is carried out using any of the conventional techniques for effecting chemical reactions. A particularly suitable method for the economical continuous procedure is to use a series of reactors in cascade arrangement. A mixture of aniline and aniline hydrochloride is introduced into the first reactor. Formaldehyde, conveniently as an aqueous solution, is introduced separately into the first reactor. However, this direct addition is not critical, the aniline hydrochloride and formaldehyde can be brought together in a pipe line mixer or the like and then introduced into a reaction vessel.

It has been found that unless the molar ratio of the total hydrochloric acid to total aniline is carefully controlled to fall within the range 0.85 to 0.97 the product will not be of satisfactory purity. Total aniline means the total number of moles of aniline and aniline hydrochloride, and total hydrochloride acid means the total number of moles of hydrochloric acid added to the aniline to form the aniline hydrochloride.

The condensation step is carried out in the temperature range of about 35° C. to about 52° C., preferably about 45° C. The reaction may be effected in a single vessel or in a series of vessels. If temperatures lower than about 35° C. are used, an undesirable solid precipitate is likely to be formed. This presents serious problems during plant operation, for example, by plugging pipe lines, fouling the reactor, and decreasing the efficiency of heat exchange. Temperatures greater than about 52° C. can adversely affect the yield and quality of the product.

The hold-up time at 35–52° C. should be between about 15 minutes to about 130 minutes; otherwise yield and quality of the product can be adversely affected in cases of reaction times less than 15 minutes; hold-up times greater than 130 minutes would adversely affect the productivity of the process.

From the condensation reaction zone, intermediate condensation product flows to a series of reactors in which the temperature is thermally staged so that the reaction mass is maintained at about 38–52° C. for at least 110 minutes, at about 60–70° C. for at least 110 minutes, and at about 88–110° C. for at least 110 minutes. Operation within these limits of time and temperature is important for obtaining a high yield of good quality product.

The reaction mass from the rearrangement procedure is removed continuously from the rearrangement step and is neutralized by contacting with alkaline material such as sodium carbonate or sodium hydroxide.

The neutralization can be conducted in the conventional manner. Thus, it can be conducted continuously by feeding the reaction mass and a solution of sodium hydroxide into a neutralization zone. The sodium hydroxide is preferably supplied at a rate to provide at least a 5 percent stoichiometric excess over the amount required to neutralize the hydrochloric acid present in the reaction mass. From the neutralization vessel the material is fed to a vessel where the resulting organic and aqueous phases are separated.

At start-up, there can be a problem of the formation of an interfacial sludge which interferes with the smooth separation of the organic and aqueous phases in the separation zone. It has been found that smooth separation can be achieved by allowing the stream from the neutralization vessel to reach its steady-state condition before introduction into the separator. This can be accomplished by initially introducing a solution containing steady-state amounts of the neutralizing agent, sodium hydroxide, and the neutralization salt, sodium chloride, into the neutralization vessel to provide a medium similar to that which will be present when a steady state of the neutralization reaction has been reached. Under conditions used in the examples, this corresponds to a solution containing about 20 percent sodium chloride and 2 percent sodium hydroxide. Good results can also be achieved by introducing the stream to be neutralized and the stream of neutralizing material into a solution containing 5 percent sodium hydroxide and preventing passage of the neutralization mass to the separator until the effluent has attained the concentration of sodium chloride that will be present when the steady-state condition has been reached.

After the aqueous and organic phases are separated, the unreacted aniline and soluble water are distilled out of the organic phase. If desired, the crude product may be further purified by distillation. If the product is to be used to prepare MDI, because of the high content in the product of the 4,4'-isomer, the crude product ban be phosgenated without purification to yield MDI which can then be easily purified to a product of high quality.

In general, yields of at least 80% are realized, and the distilled product has a freezing point of at least 90° C. This freezing point corresponds to methylenedianiline containing at least 97% by weight of the 4,4'-isomer. Yields are calculated as follows: After the aniline has been distilled off from the organic phase, distillation of the residue is continued to recover methylenedianiline until a final end-point condition is reached, namely, a temperature of 250° C. and a pressure of 0.5 mm. Hg. The yield is computed from the following formula:

$$\frac{\text{Weight of distilled methylenedianiline} + 100}{\text{Weight of distilled methylenedianiline} + \text{Weight of still residue}}$$

EXAMPLES—GENERAL PROCEDURES

In the following examples, unless otherwise specified, the reactions are carried out in a reaction system consisting of a series of 2-liter glass resin flasks in a cascade arrangement. Each reactor is equipped with an agitator, a baffle cage, a thermometer, and a common vent condenser system. Temperature control is maintained on the first reactor by means of a water bath and on subsequent reactors by controlling voltage to a resistance heater.

The formaldehyde used is a C.P. reagent grade aqueous solution containing 37% formaldehyde and 15% methanol. Formaldehyde is metered to the first reactor through a rotameter. An aqeous solution containing aniline and aniline hydrochloride is also fed to the first reactor through a rotameter. The aniline solution is prepared by mixing aniline and 37% hydrochloric acid (reagent grade) and water. The solution contains approximately 56% total aniline and hydrochloric acid in the molar ratios of total hydrochloric acid to total aniline shown in each example.

Both feed units are maintained under a constant nitrogen pressure to assure uniform feed rates.

In starting up the process, the first reactor is charged with about 150–500 ml. of water, and heat is applied to the vessel. The two feed streams are turned on, and the temperature is adjusted to give the desired operating conditions. The system is allowed to reach a steady state before recovering samples for work-up.

Unless otherwise stated, the product is recovered by a bath method. The reaction mass is made alkaline by addition to a 20–25% sodium carbonate solution at 65–70° C., the aqueous and organic phases are separated, and the organic phase is distilled. Yields are calculated as previously described.

The following examples will better illustrate the nature of the present invention; however, the invention is not intended to be limited to these examples. Parts are by weight unless otherwise indicated.

Example 1

In this example the reactor system consists of one condensation reactor and three rearrangers. The rearrangers are thermally staged as shown below. Neutralization is carried out continuously by the following technique.

The neutralizer is a standard 1.5-liter resin flask equipped with four full-length baffles and a four-blade paddle agitator operated at about 1,000 r.p.m. An aqueous solution containing 20% by weight of sodium cloride and 2% by weight of sodium hydroxide is added to the flask to serve as the neutralizing environment. A solution of 30% sodium hydroxide is then fed to the neutralizer at a rate sufficient to supply a 10% excess of sodium hydroxide based on the total HCl fed from the reactor to the neutralizer. Neutralization is carried out at 70–85° C. The reaction mass and the sodium hydroxide are fed separately into the neutralizer and after a holdup time of 25–60 minutes, the stream of neutralizer product is fed to a decanter. The aqueous and organic phases are separated, and the organic phase is distilled.

The following table shows the conditions and results of the reaction.

Molar ratios:
- Total HCl: total aniline _____ 0.94
- Total aniline: CH₂O _____ 4.0

Temperatures, degrees centigrade—
- Condensation step:
  - Reactor 1 _____ 38–42
- Rearrangement steps:
  - Reactor 2 _____ 38–42
  - Reactor 3 _____ 63–67
  - Reactor 4 _____ 88–92

Hold-up times, minutes—
- Condensation step _____ 30
- Rearrangement steps:
  - Reactor 1 _____ 117
  - Reactor 2 _____ 129
  - Reactor 3 _____ 116

Feed rates, g/hr.:
- Solution containing aniline and aniline hydrochloride _____ 959.2
- Formaldehyde solution _____ 86.2

Product:
- Yield _____ percent__ 88.6
- Freezing point _____ degrees C__ 91.1

Example 2

A similar reaction system as employed in Example 1 is employed in this example. The following table shows the conditions and the results of the reaction:

Molar ratios:
- Total HCl: total aniline _____ 0.92
- Total aniline:CH₂O _____ 3.0

Temperatures, degrees centigrade—
- Condensation step:
  - Reactor 1 _____ 43–46
- Rearrangement steps:
  - Reactor 2 _____ 45
  - Reactor 3 _____ 65
  - Reactor 4 _____ 95

Hold-up times, minutes—
- Condensation step _____ 30
- Rearrangement steps:
  - Reactor 2 _____ 120
  - Reactor 3 _____ 120
  - Reactor 4 _____ 120

Product:
- Yield _____ percent__ 84.0
- Freezing point _____ degrees__ 90.5

I claim:

1. A process for the preparation of methylenedianiline, comprising continuously introducing into a condensation reaction zone maintained at a temperature of 35–52° C.: (a) an aqueous solution of a mixture of aniline and aniline hydrochloride in which the molar ratio of total hydrochloric acid to total aniline is 0.85:1 to 0.97:1, and (b) an aqueous solution of formaldehyde, with the molar ratio of total aniline of (a) to formaldehyde of (b) being 2.8:1 to 4.0:1, continuously withdrawing the resulting reaction mass from said condensation reaction zone at such a rate that the hold-up time therein is 15–130 minutes and passing said reaction mass to a rearrangement zone consisting of first, second, and third stages arranged in series and maintained at temperatures of 38–52° C., 60–70° C., and 88–110° C., respectively, continuously withdrawing the resulting product from said rearrangement zone at such a rate that the hold-up time in each said reactors is at least 110 minutes, neutralizing said resulting product, and recovering the resulting organic phase, said phase containing said methylenedianiline.

2. The process of claim 1 wherein the molar ratio of aniline plus aniline hydrochloride to formaldehyde is 3.0:1 and the first rearrangement stage is at 45° C., the second at 65° C., and the third at 95° C.

References Cited

UNITED STATES PATENTS

| | | | |
|---|---|---|---|
| 2,683,730 | 7/1954 | Seegar et al. | 260—453 |
| 2,818,433 | 12/1957 | Erickson | 260—570 |
| 3,163,666 | 12/1964 | Kirss et al. | 260—453 |
| 3,253,031 | 5/1966 | Powers | 260—570 |
| 3,274,247 | 9/1966 | Repper | 260—570 |
| 3,277,173 | 10/1966 | Powers et al. | 260—570 |
| 3,297,759 | 1/1967 | Curtiss et al. | 260—570 |

ROBERT V. HINES, Primary Examiner

U.S. Cl. X.R.

260—453, 77.5